UNITED STATES PATENT OFFICE.

EDMUND H. TAYLOR, JR., OF FRANKFORT, KENTUCKY.

MAKING WHISKY.

SPECIFICATION forming part of Letters Patent No. 262,256, dated August 8, 1882.

Application filed February 23, 1882. (No specimens.)

*To all whom it may concern:*

Be it known that I, EDMUND H. TAYLOR, Jr., a citizen of the United States, residing at Frankfort, in the county of Franklin and State of Kentucky, have invented certain new and useful Improvements in Making Whisky, of which the following is a specification.

The object of my invention is to save and to utilize in succeeding operations the starch, sugar, and yeast spores which pass out of the still in the slop or spent beer. Others have attempted to do this before me, and have succeeded in such a measure as to increase the yield of spirit from a given quantity of grain for a series of four or five rotations. This has been accomplished by allowing the slop to settle or to filter, leaving a clear liquor which was used to dilute the next mash. Both starch and yeast spores are heavier than water, and will settle out of it. They also preserve their organic form in the slop and may be filtered out. Some sugar, being in actual solution in the slop, would be saved even after the liquor was filtered or settled clear; but all the starch or yeast spores so saved would be in consequence of imperfection in the process. So that process, if well executed, would defeat its own purpose; but that process has another suicidal propensity, becoming fatal in the fourth or fifth generation. The time required to settle or filter the slop clear also serves to generate acid fermentation. This is so detrimental that though fresh yeast is added at each rotation, yet the process must be abandoned and a wholly new yeast must be used after the fourth or fifth round, the slop being too sour for further use.

I have discovered that these objections may be avoided by the following means, which constitute my invention. This has been partially described in my application for Letters Patent filed December 27, 1881, serial number 48,720; and the object of the present application is to cover the principle therein described as applied to further steps in the process of making whisky.

While allowing the spent beer or slop to flow from the still I interpose a mechanical filter or screen, which allows that portion of the slop containing the finer particles to pass through it, but separates the bran and all coarse matter, causing them to pass into the stock-feeding troughs. The slop is thus partially clarified, yet contains a great deal of imperfectly-cooked meal, hiding starch and yeast spores, and having the appearance of very thin mash, but not like clear liquor. A portion of this screened slop is taken while yet hot from the still to cook the fresh meal for a new wort. The rest is drawn into cooling-vats.

Fair results may be obtained without using new yeast on account of the large percentage of yeast spores contained in the screened slop used for cooking; but I find great advantage in cooling with said screened slop, and still more by using additional slop in the fermenters, not only as an additional fermenting principle, but because of the increased yield from the material in the slop not formerly converted. By this process fermentation is vigorous and healthy, and it may be continued indefinitely without adding new yeast. After fermentation is complete the wort or mash is called "beer," and is distilled as usual.

The following are the main characteristics of my invention:

First, the slop is quickly separated, the fine from the coarse part, after leaving the still.

Second, the fine part, which I have termed "screened slop," is used immediately—that is, before it sours—for the purpose stated.

By this means I have produced a larger yield of whisky from a given quantity of grain than I have seen on record. At the same time my whisky so produced is of unvarying superior quality.

For the purpose of separating the slop, as stated, I use a wire screen of forty meshes to the inch; but any known mechanical device common for such purposes that will quickly separate the fine from the coarse part of the slop at about the gage of fineness stated may be used.

Having thus fully described my invention, what I wish to secure by Letters Patent is the following:

1. In the manufacture of whisky, the process which consists in screening, straining, or otherwise mechanically separating the bran and other coarse matter from the slop, and then cooking fresh meal for subsequent operations with this screened slop, substantially as specified.

2. In the manufacture of whisky, the process which consists in screening the slop, cooking fresh meal with such screened slop, and then cooling the cooked product with another addition of said screened slop, substantially as set forth.

3. In the manufacture of whisky, the process which consists in screening the slop, cooking fresh meal with said screened slop, cooling the cooked product with another addition of said screened slop, and diluting the mash with still further addition of screened slop, all substantially as set forth.

In testimony whereof I affix my signature in presence of two witnesses.

EDMUND H. TAYLOR, JR.

Witnesses:
SAMUEL R. SMITH,
FRANCIS HEENEY.